US012629692B2

(12) United States Patent
Lin et al.

(10) Patent No.: US 12,629,692 B2
(45) Date of Patent: May 19, 2026

(54) METHOD AND DEVICE FOR COOPERATIVE CONTROL OF RICE HULLING AND RICE POLISHING, AND STORAGE MEDIUM

(71) Applicant: CENTRAL SOUTH UNIVERSITY OF FORESTRY AND TECHNOLOGY, Changsha (CN)

(72) Inventors: Qinlu Lin, Changsha (CN); Yuqin Ding, Changsha (CN); Zhirong Jiang, Changsha (CN); Jiangtao Li, Changsha (CN); Wenfang Han, Changsha (CN); Shuguo Sun, Changsha (CN)

(73) Assignee: CENTRAL SOUTH UNIVERSITY OF FORESTRY AND TECHNOLOGY, Changsha (CN)

( * ) Notice: Subject to any disclaimer, the term of this patent is extended or adjusted under 35 U.S.C. 154(b) by 754 days.

(21) Appl. No.: 18/083,460

(22) Filed: Dec. 16, 2022

(65) Prior Publication Data

US 2023/0321664 A1 Oct. 12, 2023

(30) Foreign Application Priority Data

Apr. 11, 2022 (CN) .......................... 202210377217.9

(51) Int. Cl.
| | |
|---|---|
| *B02B 5/02* | (2006.01) |
| *B02B 3/00* | (2006.01) |
| *G06Q 10/20* | (2023.01) |
| *G06Q 99/00* | (2006.01) |

(52) U.S. Cl.
CPC .................. *B02B 5/02* (2013.01); *B02B 3/00* (2013.01); *G06Q 10/20* (2013.01); *G06Q 99/00* (2013.01)

(58) Field of Classification Search
CPC .... B02B 3/00; B02B 5/02; B02B 7/02; G06Q 99/00; G06Q 10/20
See application file for complete search history.

(56) References Cited

FOREIGN PATENT DOCUMENTS

| | | | | | |
|---|---|---|---|---|---|
| CN | 202442776 U | * | 9/2012 | | |
| CN | 105181643 B | * | 3/2018 | | |
| CN | 113426709 A | * | 9/2021 | .............. | B07C 5/18 |
| CN | 215354541 U | * | 12/2021 | | |
| JP | H1183836 A | * | 3/1999 | | |

* cited by examiner

*Primary Examiner* — Thien S Tran

(57) ABSTRACT

The present disclosure provides a method and device for cooperative control of rice hulling and rice polishing, and a storage medium. The method includes: acquiring operation data of a rice huller during a rice hulling process; acquiring operation data of a rice polisher during a rice polishing process; acquiring real-time detection data of rice samples after rice hulling and rice polishing; establishing, an energy consumption prediction model and a broken rice rate prediction model via a neural network and in combination with the operation data of a rice huller and the operation data of a rice polisher; based on a machine learning algorithm, and in combination with the energy consumption prediction model, the broken rice rate prediction model and the real-time detection data, acquiring an optimized process parameter set; and controlling rice processing in real time according to the optimized process parameter set.

20 Claims, 4 Drawing Sheets

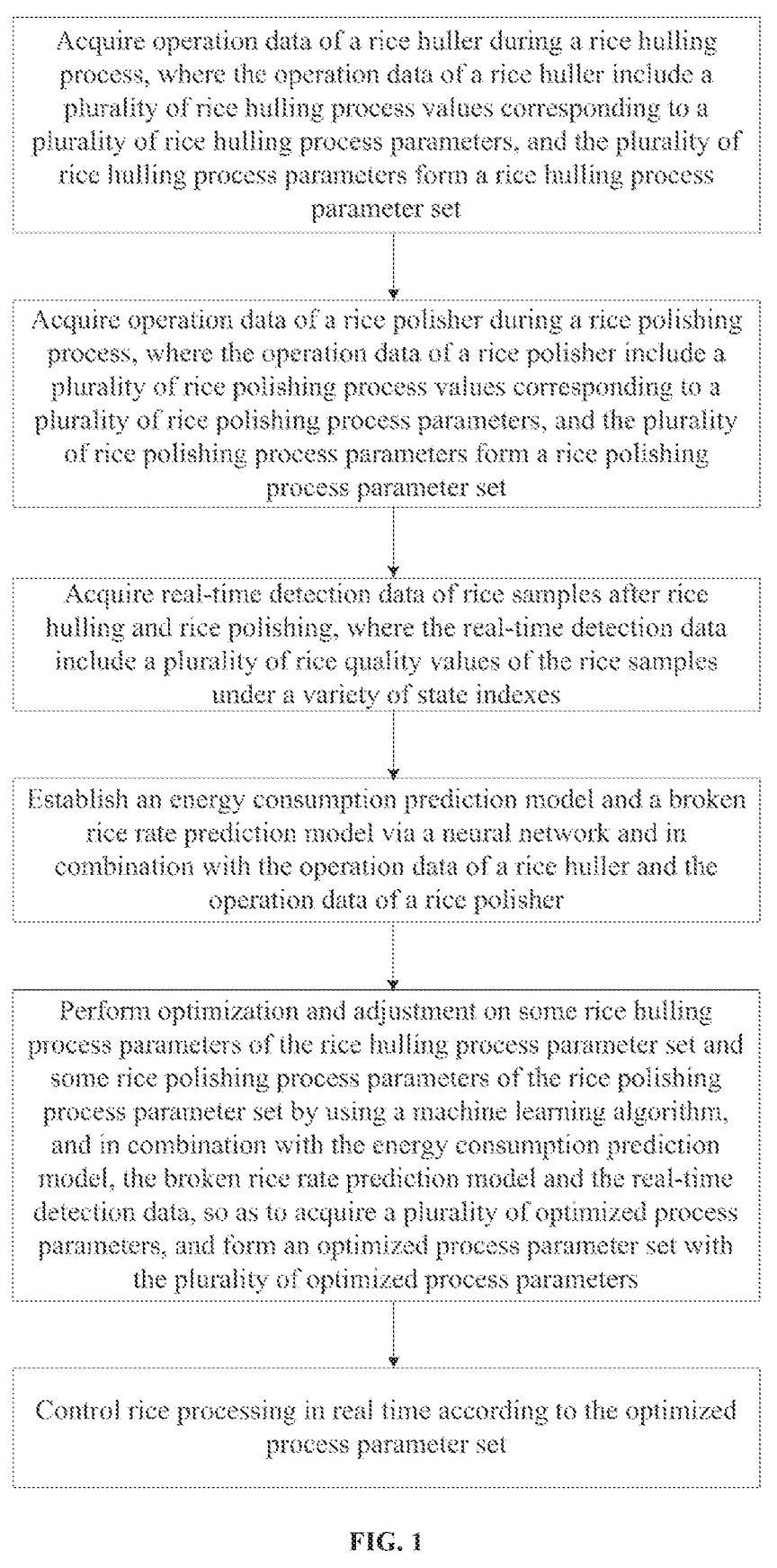

Acquire operation data of a rice huller during a rice hulling process, where the operation data of a rice huller include a plurality of rice hulling process values corresponding to a plurality of rice hulling process parameters, and the plurality of rice hulling process parameters form a rice hulling process parameter set Acquire operation data of a rice polisher during a rice polishing process, where the operation data of a rice polisher include a plurality of rice polishing process values corresponding to a plurality of rice polishing process parameters, and the plurality of rice polishing process parameters form a rice polishing process parameter set Acquire real-time detection data of rice samples after rice hulling and rice polishing, where the real-time detection data include a plurality of rice quality values of the rice samples under a variety of state indexes Establish an energy consumption prediction model and a broken rice rate prediction model via a neural network and in combination with the operation data of a rice huller and the operation data of a rice polisher Perform optimization and adjustment on some rice hulling process parameters of the rice hulling process parameter set and some rice polishing process parameters of the rice polishing process parameter set by using a machine learning algorithm, and in combination with the energy consumption prediction model, the broken rice rate prediction model and the real-time detection data, so as to acquire a plurality of optimized process parameters, and form an optimized process parameter set with the plurality of optimized process parameters Control rice processing in real time according to the optimized process parameter set

FIG. 1

METHOD AND DEVICE FOR COOPERATIVE CONTROL OF RICE HULLING AND RICE POLISHING, AND STORAGE MEDIUM

CROSS REFERENCE TO RELATED APPLICATION

This patent application claims the benefit and priority of Chinese Patent Application No. 202210377217.9, filed with the China National Intellectual Property Administration on Apr. 11, 2022, the disclosure of which is incorporated by reference herein in its entirety as part of the present application.

TECHNICAL FIELD

The present disclosure relates to the technical field of rice processing, and in particular to a method and device for cooperative control of rice hulling and rice polishing, and a storage medium.

BACKGROUND

With growing market demands, excessive processing has now become a prevalent problem in the rice processing industry. Although excessive processing can make rice "fine, white and bright", it results in decrease of milled rice rate, nutrient loss, and the increase of processing loss and energy consumption, which further leads to the waste of grain resources and the decline of corporate profitability. "Moderate processing" can reduce processing loss and energy consumption. However, it also brings many challenges to the industry. As a traditional industry, rice processing industry has boosted a mature process design featured by "cleaning, hulling, polishing and selection". However, at present, neither the processing technology nor the equipment manufacturing can meet the needs of "moderate processing".

Equipment used in the present rice production line, such as a rice huller and a rice polisher, is independently controlled, that is, each set of equipment is equipped with an independent controller, without regard for the impact of the stress on rice kernels in the process of rice hulling to rice polishing. In addition, in the existing rice production process, it generally takes professionals to check the effect of rice hulling and rice polishing every 1 to 2 hours, and then set parameters to debug the rice huller and rice polisher depending on their experience. However, manual control of the cooperative work of all sets of equipment not only leads to low efficiency, but also causes poor reliability and poor stability. There is a need for a clear optimal process parameters combination that can accurately control rice processing accuracy while minimizing the broken rice rate, bran removal degree and energy consumption.

SUMMARY

The present disclosure is intended to solve at least one of technical problems of the prior art. For this reason, the present disclosure provides a method for cooperative control of rice hulling and rice polishing, and aims at minimizing the broken rice rate, the bran removal degree and energy consumption while solving the problem that existing rice processing equipment can hardly control the rice processing precision.

In addition, the present disclosure provides a device for cooperative control of rice hulling and rice polishing, and a computer readable a storage medium.

According to an embodiment in a first aspect of the present disclosure, the method for cooperative control of rice hulling and rice polishing includes the following steps:

acquiring operation data of a rice huller during a rice hulling process, where the operation data of a rice huller include a plurality of rice hulling process values corresponding to a plurality of rice hulling process parameters, and the plurality of rice hulling process parameters form a rice hulling process parameter set;

acquiring operation data of a rice polisher during a rice polishing process, where the operation data of a rice polisher include a plurality of rice polishing process values corresponding to a plurality of rice polishing process parameters, and the plurality of rice polishing process parameters form a rice polishing process parameter set;

acquiring real-time detection data of rice samples after rice hulling and rice polishing, where the real-time detection data include a plurality of rice quality values of the rice samples under a variety of state indexes;

establishing an energy consumption prediction model and a broken rice rate prediction model via a neural network and in combination with the operation data of a rice huller and the operation data of a rice polisher;

performing optimization and adjustment on some rice hulling process parameters of the rice hulling process parameter set and some rice polishing process parameters of the rice polishing process parameter set by using a machine learning algorithm and in combination with the energy consumption prediction model, the broken rice rate prediction model and the real-time detection data, so as to acquire a plurality of optimized process parameters, and forming an optimized process parameter set with the plurality of optimized process parameters; and controlling rice processing in real time according to the optimized process parameter set.

The method for cooperative control of rice hulling and rice polishing achieves at least the following technical effects: the operation data of a rice huller and operation data of a rice polisher during rice polishing are acquired respectively during rice hulling and rice polishing; the energy consumption prediction model and the broken rice rate prediction model are established using a neural network; based on the neural network model and real-time detection data, the performance of rice hulling and rice polishing is optimized using a genetic algorithm; and finally, cooperative control of rice hulling and rice polishing is achieved using the optimized process parameter set, so that the precise and intelligent control of the rice processing and rice products is further achieved, thereby realizing the purpose of lowering energy consumption and loss in rice processing. Compared with some prior arts, rice processing equipment using the method for cooperative control of rice hulling and rice polishing according to embodiments of the present disclosure can guarantee high reliability and stability, and the rice processing accuracy can be controlled while the broken rice rate, the bran removal degree and energy consumption are minimized.

According to some embodiments of the present disclosure, said establishing, an energy consumption prediction model and a broken rice rate prediction model via a neural network and in combination with the operation data of a rice huller and the operation data of a rice polisher includes the following steps:

determining a decision variable set of a rice processing technology according to the rice hulling process parameter set and the rice polishing process parameter set;

eliminating abnormal values in the operation data of a rice huller and the operation data of a rice polisher, performing normalization processing to obtain a sample set, and randomly classifying samples in the sample set to a training set and a test set in a proportion of 4:1;

training the neural network using the training set with the decision variable set as an input variable of the neural network, and energy consumption and a broken rice rate as output variables of the neural network so as to obtain the energy consumption prediction model and the broken rice rate prediction model; and testing the neural network using the test set.

According to some embodiments of the present disclosure, the energy consumption prediction model and the broken rice rate prediction model are constrained respectively using following numerical relationship models:

$$y(E) = f(x_1, x_2, x_3, x_4, x_5, x_6, x_7, x_8, x_9, x_{10}, x_{11}, x_{12}),$$

$$y(S) = f(x_1, x_2, x_3, x_4, x_5, x_6, x_7, x_8, x_9, x_{10}, x_{11}, x_{12}),$$

where $y(E)$ denotes the energy consumption prediction model, $y(S)$ denotes the broken rice rate prediction model, $x_1$ denotes a linear velocity of a high-speed rubber roll of the rice huller, $x_2$ denotes a linear velocity of a low-speed rubber roll of the rice huller, $x_3$ denotes a linear velocity difference of the rice huller, $x_4$ denotes a roll pitch of the rubber roll of the rice huller, $x_5$ denotes an air volume of the rice huller, $x_6$ denotes a roll pressure of the rubber roll of the rice huller, $x_7$ denotes a number of passes of rice polishing, $x_8$ denotes a feeding flow of the rice polisher, $x_9$ denotes an air pressure inside a rice polishing chamber, $x_{10}$ denotes a temperature inside the rice polishing chamber, $x_{11}$ denotes a revolving speed of an emery roll of the rice polisher, and $x_{12}$ denotes a pressure at a discharging port of the rice polisher.

According to some embodiments of the present disclosure, said performing optimization and adjustment on some rice hulling process parameters of the rice hulling process parameter set and some rice polishing process parameters of the rice polishing process parameter set by using a machine learning algorithm and in combination with the energy consumption prediction model, the broken rice rate prediction model and the real-time detection data, so as to acquire a plurality of optimized process parameters includes the following substeps:

establishing an objective function group according to the energy consumption prediction model, the broken rice rate prediction model and the real-time detection data, where the objective function group is configured to represent a relationship between process performance of the rice hulling and rice polishing and the decision variable set; and based on a genetic algorithm, solving a set of optimal solutions from the objective function group to obtain the optimized process parameter set which corresponds to the decision variable set.

According to some embodiments of the present disclosure, the objective function group includes an energy consumption objective function, a broken rice rate objective function and a bran removal degree objective function, and the objective function group is constrained using following numerical relationship models:

$$f_1 = \min(y(E)),$$

$$f_2 = \min(y(S)),$$

$$f_3 = \min\left(\frac{DOM_R - DOM_G}{DOM_G}\right),$$

where $f_1$ denotes the energy consumption objective function, $f_2$ denotes the broken rice rate objective function, $f_3$ denotes the bran removal degree objective function, $y(E)$ denotes the energy consumption prediction model, $y(S)$ denotes the broken rice rate prediction model, $DOM_R$ denotes an actual bran removal degree of a rice sample, $DOM_G$ denotes a preset bran removal degree of the rice sample, and min $$\left(\frac{DOM_R - DOM_G}{DOM_G}\right)$$

denotes a minimum deviation in the bran removal degree of the rice sample.

According to some embodiments of the present disclosure, said based on a genetic algorithm, solving a set of optimal solutions from the objective function group to obtain the optimized process parameter set includes the following substeps:

uniformly generating K chromosome individuals with each having a dimension of 12 in a solution space to generate a primary population, setting a population size to be N=100, setting a maximum number of evolution iterations to be 150, and initializing a selected ratio, a crossover probability and a mutation probability;

based on a calculated value of the objective function group, conducting fast non-dominated sorting and crowding degree calculation on each of chromosome individuals in the primary population;

conducting selection, crossover and mutation on the primary population to obtain a next-generation population;

merging the primary population with the next-generation population to obtain a new population;

based on a calculated value of the objective function group, conducting fast non-dominated sorting and crowding degree calculation on each of chromosome individuals in the new population;

selecting qualified individuals from the new population to form a new primary population; and determining a number of evolution iterations during an evolution process: if the number of evolution iterations is smaller than the maximum number of evolution iterations, adding 1 to the number of evolution iterations, and conducting selection, crossover and mutation on the primary population to obtain a next-generation population; and if the number of evolution iterations is greater than the maximum number of evolution iterations, stopping iteration and outputting the optimized process parameter set.

According to some embodiments of the present disclosure, said controlling rice processing in real time according to the optimized process parameter set includes the following substeps:

acquiring the real-time detection data in a current rice processing period, and determining a target value of the process performance of the rice hulling and rice polishing;

if the real-time detection data reach the target value, determining the corresponding optimized process parameter set, and maintaining equipment operation based on the optimized process parameter set; and if the real-time detection data do not reach the target value, conducting time series prediction by the trained neural network, and in combination with the operation data of a rice huller and the operation data of a rice polisher so as to obtain an optimized process parameter set updated in a next rice processing period, when the real-time detection data reach the target value, determining a corresponding optimized process parameter set, and maintaining equipment operation with the determined optimized process parameter set.

According to some embodiments of the present disclosure, the rice hulling process parameters of the rice huller include a feeding flow, a discharging flow, rice hulling energy consumption, a roll pitch of a rubber roll, a roll pressure of the rubber roll, a linear velocity of the rubber roll and a linear velocity difference of the rubber roll; the rice polishing process parameters of the rice polisher include a feeding flow, a discharging flow, rice polishing energy consumption, an air pressure inside a rice polishing chamber, a temperature inside the rice polishing chamber, a revolving speed of an emery roll, a pressure at a discharging port and a temperature at the discharging port; and the variety of state indexes include a variety, a water content, a grain shape, a husking rate, a bran removal degree, a broken rice rate, a head rice rate and a germ-remained rate.

According to an embodiment in a second aspect of the present disclosure, the device for cooperative control of rice hulling and rice polishing includes:

a rice processing unit, including: a plurality of rice hullers, where each of the rice hullers is configured to remove chaff from rice; and a plurality of rice polishers, where each of the rice polishers is configured to polish rice treated by the rice huller;

a data acquisition unit, including: a data acquisition device of a rice huller, where the data acquisition device of a rice huller is configured to acquire operation data of the plurality of rice hullers; a data acquisition device of a rice polisher, where the data acquisition device of a rice polisher is configured to acquire operation data of the plurality of rice polishers; and a sample detector configured to acquire values of a plurality of rice samples under a plurality of state indexes; and a cooperative control unit configured to execute the method for cooperative control of rice hulling and rice polishing according to any embodiment in the first aspect of the present disclosure.

The device for cooperative control of rice hulling and rice polishing achieves at least the following technical effects: by executing the method for cooperative control of rice hulling and rice polishing in the cooperative control unit, and acquiring the operation data of a rice huller, the operation data of a rice polisher and real-time detection data using the data acquisition device of a rice huller, a data acquisition device of a rice polisher and a sample detector in the data acquisition unit, respectively, cooperative control of a plurality of rice hullers and a plurality of rice polishers in the rice processing unit is achieved, and precise and intelligent control of the rice processing and rice products is further achieved, thereby realizing the purpose of lowering energy consumption and loss in rice processing. Compared with some prior arts, the device for cooperative control of rice hulling and rice polishing according to embodiments of the present disclosure can guarantee high reliability and stability, and the rice processing accuracy can be controlled while the broken rice rate, the bran removal degree and energy consumption are minimized.

According to an embodiment in a third aspect of the present disclosure, the computer-readable storage medium stores a computer-executable instruction, and the computer-executable instruction is configured to enable a computer to perform the method for cooperative control of rice hulling and rice polishing according to any embodiment in the first aspect of the present disclosure.

The computer-readable storage medium according to embodiments of the present disclosure achieves at least the following technical effects: by embedding the computer-readable storage medium into a microprocessor chip, the microprocessor chip can execute the method for cooperative control of rice hulling and rice polishing according to an embodiment in a first aspect of the present disclosure in the device for cooperative control of rice hulling and rice polishing according to an embodiment in a second aspect of the present disclosure.

Additional aspects and advantages of the present disclosure will be partly provided in the following description, and partly become evident in the following description or understood through the practice of the present disclosure.

BRIEF DESCRIPTION OF THE DRAWINGS

The above and/or additional aspects and advantages of the present disclosure will become apparent and easy to understand from the description of the examples in conjunction with the following drawings.

FIG. 1 is a schematic flow chart of a method for cooperative control of rice hulling and rice polishing according to an embodiment of the present disclosure;

REFERENCE NUMERALS

Figure 2:
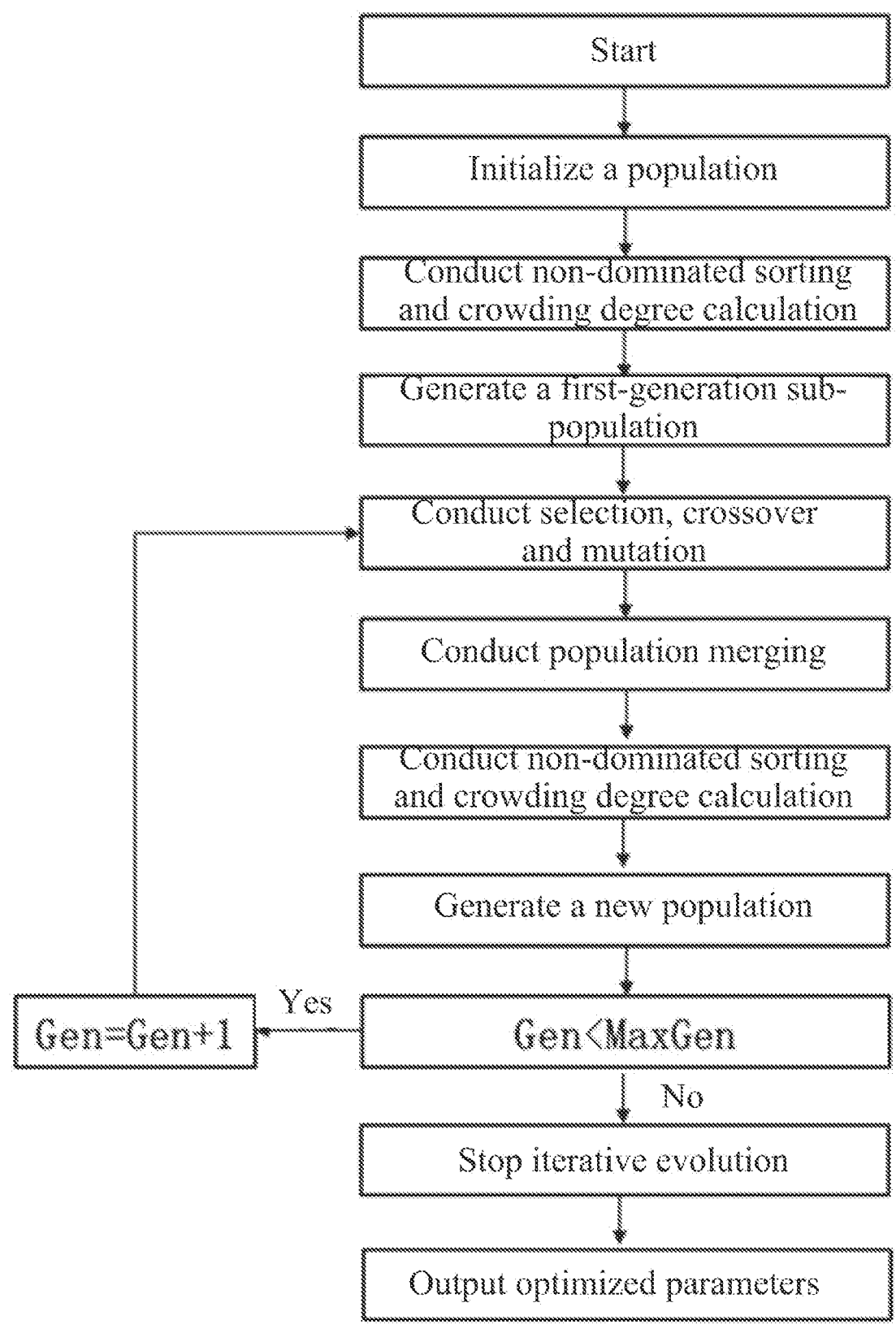
FIG. 2 is a schematic flow chart of a genetic algorithm according to an embodiment of the present disclosure.

Rice huller 110; rice polisher 120; unpolished rice separator 130;

data acquisition device 210 of a rice huller; data acquisition device 220 of a rice polisher; sample detector 230; and cooperative control unit 300.

DETAILED DESCRIPTION OF THE EMBODIMENTS

The embodiments of the present disclosure are described below in detail. Examples of the embodiments are shown in the drawings. The same or similar numerals represent the same or similar elements or elements having the same or similar functions throughout the specification. The embodiments described below with reference to the drawings are exemplary. They are only used to explain the present disclosure, and should not be construed as a limitation to the present disclosure.

In the description of the present disclosure, it should be understood that, in orientation description, orientation or position relationships indicated by terms such as "upper", "lower", "front", "rear", "left", "right", "top", "bottom", "inside" and "outside" are orientation or position relationships as shown in the drawings. These terms are merely intended to facilitate and simplify the description of the present disclosure, rather than to indicate or imply that the mentioned device or components must have a specific orientation or must be constructed and operated in a specific orientation. Therefore, these terms should not be understood as a limitation to the present disclosure.

In the description of the present disclosure, "a plurality of" means two or more. The "first" and "second" in the description are merely intended to distinguish technical features, rather than to indicate or imply relative importance or implicitly indicate a number of the indicated technical features or implicitly indicate a sequence relationship of the indicated technical features.

In the description of the present disclosure, unless otherwise explicitly defined, the words such as "arrange", "install", "connect" and "disconnect" should be understood in a broad sense, and those skilled in the technical field can reasonably determine the specific meanings of the above words in the present disclosure in combination with specific contents of the technical solutions.

The method for cooperative control of rice hulling and rice polishing according to an embodiment in a first aspect of the present disclosure is described below with reference to FIG. 1 to FIG. 4.

The method for cooperative control of rice hulling and rice polishing includes the following steps:

Acquire operation data of a rice huller during a rice hulling process, where operation data of a rice huller include a plurality of rice hulling process values corresponding to a plurality of rice hulling process parameters, and the plurality of rice hulling process parameters form a rice hulling process parameter set;

acquire operation data of a rice polisher during a rice polishing process, where operation data of a rice polrice rate prediction model and the real-time detection data, so as to acquire a plurality of optimized process parameters, and form an optimized process parameter set with the plurality of optimized process parameters; and control rice processing in real time according to the optimized process parameter set.

Referring to FIG. 1 to FIG. 4, during rice processing, a data acquisition unit is utilized to acquire operation data of the rice huller 110, operation data of the rice polisher 120 and real-time detection data of rice samples, then the cooperative control unit 300 is utilized to process acquired data specifically in combination with a neural network and a machine learning algorithm so as to adjust relevant parameters of the rice huller 110 and the rice polisher 120, and finally, real-time cooperative control of rice processing is achieved according to an optimized process parameter set upon adjustment. In some embodiments, an unpolished rice separator 130 may be connected between the rice huller 110 and the rice polisher 120, a plurality of rice hullers 110 and a plurality of rice polishers 120 may be arranged, Rice "XING No. 2" may be used as rice samples, and more information about the variety is shown in Table 1. Compared with conventional manual control, the method for cooperative control of rice hulling and rice polishing in the embodiment of the present disclosure, when adopted to process rice "XING No. 2", can achieve lower indicators such as the broken rice rate, bran removal rate and energy consumption under the condition of the same yield, as shown in Table 2.

TABLE 1

| No. | Variety | Moisture content | Protein content | Length-width ratio |
|-----|---------|------------------|-----------------|--------------------|
| 3245 | XING No. 2 | 12.28% | 8.24% | 3.24 |

TABLE 2

| SN | Output t/h | Husking rate % | Loss of rubber roll g/100 kg rice | Broken rice rate % | Bran removal degree | Energy consumption kw/ton |
|----|-----------|----------------|-----------------------------------|--------------------|---------------------|---------------------------|
| Cooperative control of rice hulling and polishing | 1 | 92.5 | 3.54 | 7.54 | 8.2 | 28.6 |
| Manual control | 1 | 90.32 | 4.13 | 9.26 | 9.4 | 32.7 | isher include a plurality of rice polishing process values corresponding to a plurality of rice polishing process parameters, and the plurality of rice polishing process parameters form a rice polishing process parameter set;

acquire real-time detection data of rice samples after rice hulling and rice polishing, where the real-time detection data include a plurality of rice quality values of the rice samples under a variety of state indexes;

establish an energy consumption prediction model and a broken rice rate prediction model via a neural network and in combination with the operation data of a rice huller and the operation data of a rice polisher;

perform optimization and adjustment on some rice hulling process parameters of the rice hulling process parameter set and some rice polishing process parameters of the rice polishing process parameter set by using a machine learning algorithm and in combination with the energy consumption prediction model, the broken The method for cooperative control of rice hulling and rice polishing achieves at least the following technical effects: the operation data of a rice huller and operation data of a rice polisher during rice polishing are acquired respectively during rice hulling and rice polishing; the energy consumption prediction model and the broken rice rate prediction model are established using a neural network; based on the neural network model and real-time detection data, the performance of rice hulling and rice polishing is optimized using a genetic algorithm; and finally, cooperative control of rice hulling and rice polishing is achieved using the optimized process parameter set, so that the precise and intelligent control of the rice processing and rice products is further achieved, thereby realizing the purpose of lowering energy consumption and loss in rice processing. Compared with some prior arts, rice processing equipment using the method for cooperative control of rice hulling and rice polishing according to embodiments of the present disclosure can guarantee high reliability and stability, and the rice processing accuracy can be controlled while the broken rice rate, the bran removal degree and energy consumption are minimized.

According to some embodiments of the present disclosure, said establishing, an energy consumption prediction model and a broken rice rate prediction model via a neural network and in combination with the operation data of a rice huller and the operation data of a rice polisher includes the following steps:

Determine a decision variable set of a rice processing technology according to the rice hulling process parameter set and the rice polishing process parameter set;

eliminate abnormal values in the operation data of a rice huller and the operation data of a rice polisher, perform normalization processing to obtain a sample set, and randomly classify samples in the sample set to a training set and a test set in a proportion of 4:1;

train the neural network using the training set with the decision variable set as an input variable of the neural network, and energy consumption and a broken rice rate as output variables of the neural network so as to obtain the energy consumption prediction model and the broken rice rate prediction model; and test the neural network using the test set.

Specifically, variables of the decision variable set are determined by selecting relevant typical parameters of the rice hulling process parameter set and the rice polishing process parameter set, such that those variables may be used as independent variables of a neural network model. A training set and a test set may be obtained by acquiring the operation data of the rice huller and the operation data of the rice polisher, where the training set is used to train a neural network so as to obtain an energy consumption prediction model and a broken rice rate prediction model, and the test set is used to test the neutral network so as to guarantee that a training error falls within a preset error range allowed.

According to some embodiments of the present disclosure, the energy consumption prediction model and the broken rice rate prediction model are constrained respectively using following numerical relationship models:

$$y(E)=f(x_1,x_2,x_3,x_4,x_5,x_6,x_7,x_8,x_9,x_{10},x_{11},x_{12}),$$

$$y(S)=f(x_1,x_2,x_3,x_4,x_5,x_6,x_7,x_8,x_9,x_{10},x_{11},x_{12}),$$

where y(E) denotes the energy consumption prediction model, y(S) denotes the broken rice rate prediction model, $x_1$ denotes a linear velocity of a high-speed rubber roll of the rice huller, $x_2$ denotes a linear velocity of a low-speed rubber roll of the rice huller, $x_3$ denotes a linear velocity difference of the rice huller, $x_4$ denotes a roll pitch of the rubber roll of the rice huller, $x_5$ denotes an air volume of the rice huller, $x_6$ denotes a roll pressure of the rubber roll of the rice huller, $x_7$ denotes a number of passes of rice polishing, $x_8$ denotes a feeding flow of the rice polisher, $x_9$ denotes an air pressure inside a rice polishing chamber, $x_{10}$ denotes a temperature inside the rice polishing chamber, $x_{11}$ denotes a revolving speed of an emery roll of the rice polisher, and $x_{12}$ denotes a pressure at a discharging port of the rice polisher.

Specifically, the rice hulling process parameters of the rice huller including a linear velocity and a linear velocity difference of a high-speed rubber roll and a low-speed rubber roll, a roll pitch of a rubber roll, a roll pressure of the rubber roll, an air pressure and a number of passes of rice hulling; and the rice polishing process parameters of the rice polisher including a feeding flow, an air pressure inside a rice polishing chamber, a temperature inside the rice polishing chamber, a revolving speed of an emery roll, and a pressure at a discharging port may be determined. These key parameters in the rice processing technology are used as decision variables, so as to establish a prediction model relevant to energy consumption and the broken rice rate. In some embodiments, a prediction model relevant to performance such as yield may further be established as required.

According to some embodiments in the present disclosure, said performing optimization and adjustment on some rice hulling process parameters of the rice hulling process parameter set and some rice polishing process parameters of the rice polishing process parameter set by using a machine learning algorithm and in combination with the energy consumption prediction model, the broken rice rate prediction model and the real-time detection data, so as to acquire a plurality of optimized process parameters includes the following substeps:

establish an objective function group according to the energy consumption prediction model, the broken rice rate prediction model and the real-time detection data, where the objective function group is configured to represent a relationship between process performance of the rice hulling and rice polishing and the decision variable set; and based on a genetic algorithm, solve a set of optimal solutions from the objective function group to obtain an optimized process parameter set which corresponds to the decision variable set.

Specifically, the objective function group includes a plurality of objective functions which can be established according to the neural network model and rice sample processing quality. The range of independent variables of the objective functions is specifically constrained by the rice processing parameters or the performance standards for the processing quality of rice samples. For multiple objective functions, it is desirable to adopt Multiobjective Genetic Algorithm to solve optimal solutions from the objective functions, so as to obtain multiple optimized process parameters in the optimized process parameter set corresponding to each decision variable in the decision variable set.

According to some embodiments of the present disclosure, the objective function group includes an energy consumption objective function, a broken rice rate objective function and a bran removal degree objective function, and the objective function group is constrained using following numerical relationship models:

$$f_1 = \min(y(E)),$$

$$f_2 = \min(y(S)),$$

$$f_3 = \min\left(\frac{DOM_R - DOM_G}{DOM_G}\right),$$

where $f_1$ denotes the energy consumption objective function, $f_2$ denotes the broken rice rate objective function, $f_3$ denotes the bran removal degree objective function, y(E) denotes the energy consumption prediction model, y(S) denotes the broken rice rate prediction model, $DOM_R$ denotes an actual bran removal degree of a rice sample, $DOM_G$ denotes a preset bran removal degree of the rice sample, and min $$\left(\frac{DOM_R - DOM_G}{DOM_G}\right)$$

denotes a minimum deviation in the bran removal degree of the rice sample.

According to some embodiments, the objective function group includes, but is not limited to an energy consumption objective function, a broken rice rate objective function and a bran removal degree objective function. Some related functions can also be established depending on the practical need, such as a yield objective function, a husking rate objective function, and a germ-remained rate objective function.

In some embodiments of the present disclosure, said based on a genetic algorithm, solve a set of optimal solutions from the objective function group to obtain the optimized process parameter set includes the following substeps:

Step S1: uniformly generate K chromosome individuals with each having a dimension of 12 in a solution space to generate a primary population, setting a population size to be N=100, set a maximum number of evolution iterations to be 150, and initialize a selected ratio, a crossover probability and a mutation probability;

Step S2: based on the calculated value of the objective function group, conduct fast non-dominated sorting and crowding degree calculation on each of chromosome individuals in the primary population;

Step S3: conduct selection, crossover and mutation on the primary population to obtain a next-generation population;

Step S4: merge the primary population with the next-generation population to obtain a new population;

Step S5: based on the calculated value of the objective function group, conduct fast non-dominated sorting and crowding degree calculation on each of chromosome individuals in the new population;

Step S6: select qualified individuals from the new population to form a new primary population; and Step S7: determine a number of evolution iterations during an evolution process: if the number of evolution iterations is smaller than the maximum number of evolution iterations, add 1 to the number of evolution iterations, and proceed to Step S3; and if the number of evolution iterations is greater than the maximum number of evolution iterations, stop iteration and output an optimized process parameter set.

Specifically, Multiobjective Genetic Algorithm based on linear weighting may be adopted, such as RWGA and VEGA. In addition, Multiobjective Genetic Algorithm based on Pareto sorting may also be adopted, such as MOGA, NSGA and NSGA-II.

In some embodiments of the present disclosure, said controlling rice processing in real time according to the optimized process parameter set includes the following substeps:

Acquire the real-time detection data in a current rice processing period, and determine a target value of the process performance of the rice hulling and rice polishing;

if the real-time detection data reach the target value, determine the corresponding optimized process parameter set, and maintain equipment operation based on the optimized process parameter set; and if the -time detection data do not reach the target value, conduct time series prediction by the trained neural network, and in combination with the operation data of a rice huller and the operation data of a rice polisher so as to obtain an optimized process parameter set updated in a next rice processing period, when the real-time detection data reach the target value, determine a corresponding optimized process parameter set, and maintain equipment operation with the determined optimized process parameter set.

Specifically, monitor rice quality in real time within a period of time after optimized process parameters are adopted, so as to determine whether the optimized process parameters during this period of time meet the final standard: if yes, adopt the optimized process parameter set during this period; if not, conduct prediction using a neural network to obtain predictive parameters regarding the energy consumption and broken rice rate, and conduct renormalization on the predictive parameters to obtain actual predicted values and then update the optimized process parameters until the optimized process parameters meet the standard. In this way, real-time cooperative control over the rice processing is achieved.

In some embodiments of the present disclosure, the rice hulling process parameters of the rice huller include a feeding flow, a discharging flow, rice hulling energy consumption, a roll pitch of a rubber roll, a roll pressure of the rubber roll, a linear velocity of the rubber roll and a linear velocity difference of the rubber roll; the rice polishing process parameters of the rice polisher include a feeding flow, a discharging flow, rice polishing energy consumption, an air pressure inside a rice polishing chamber, a temperature inside the rice polishing chamber, a revolving speed of an emery roll, a pressure at a discharging port and a temperature at the discharging port; and the variety of state indexes include a variety, a water content, a grain shape, a husking rate, a bran removal degree, a broken rice rate, a head rice rate and a germ-remained rate.

According to an embodiment in a second aspect of the present disclosure, the device for cooperative control of rice hulling and rice polishing includes: a rice processing unit, a data acquisition unit and a cooperative control unit 300. The rice processing unit includes: a plurality of rice hullers 110, where each of the rice hullers 110 is configured to remove chaff from rice; and a plurality of rice polishers 120, where each of the rice polishers 120 is configured to polish rice treated by the rice huller 110. The data acquisition unit includes: a data acquisition device 210 of a rice huller, where the data acquisition device 210 of a rice huller is configured to acquire operation data of the plurality of rice hullers 110; a data acquisition device 220 of a rice polisher, where the data acquisition device 220 of a rice polisher is configured to acquire operation data of the plurality of rice polishers 120; and a sample detector 230 configured to acquire values of a plurality of rice samples under a plurality of state indexes. The cooperative control unit 300 is configured to execute the method for cooperative control of rice hulling and rice polishing according to any embodiment in the first aspect of the present disclosure.

Figure 3:
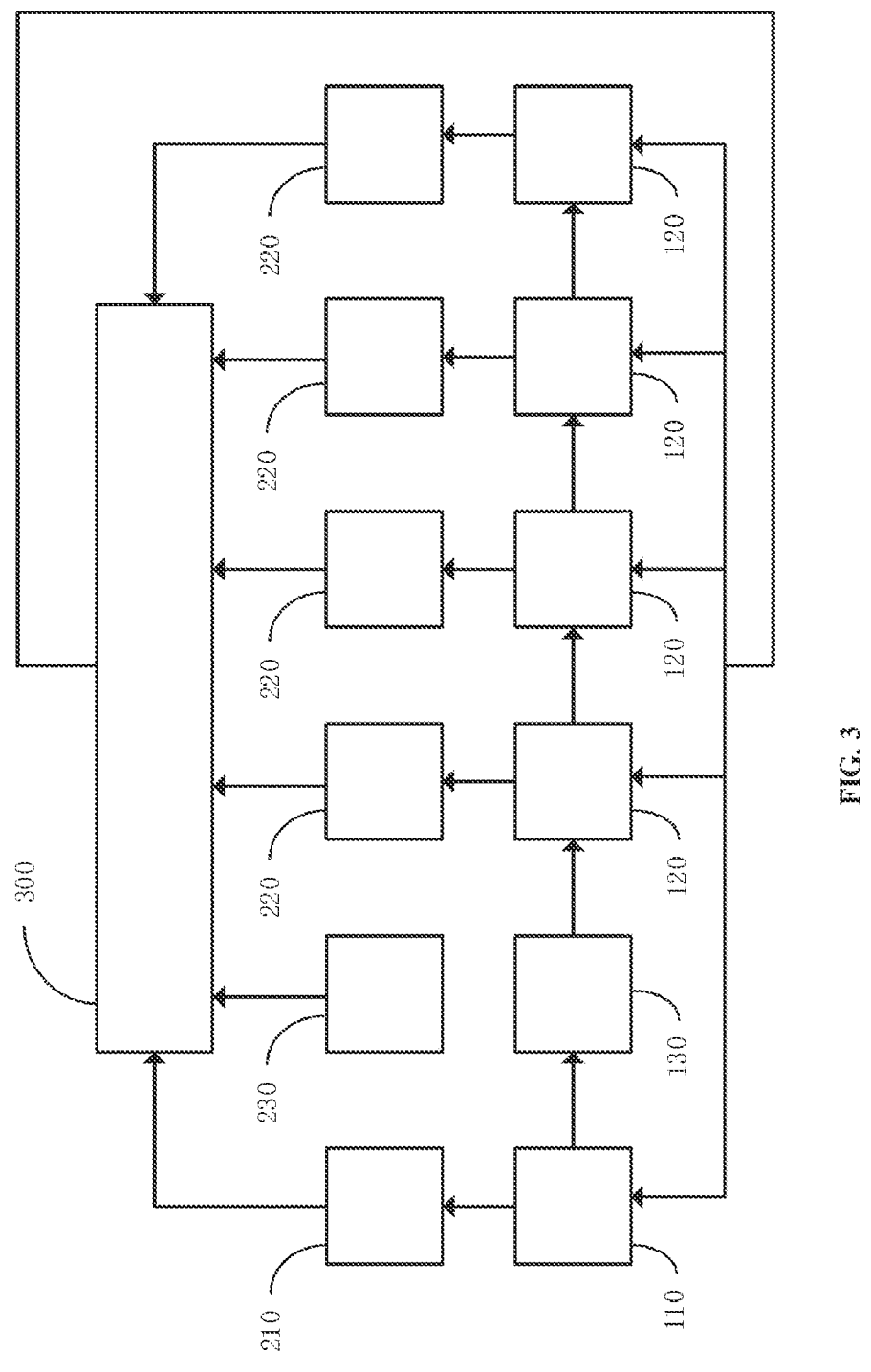
FIG. 3 is a schematic diagram of connection of a device for cooperative control of rice hulling and rice polishing according to an embodiment of the present disclosure.
Figure 4:
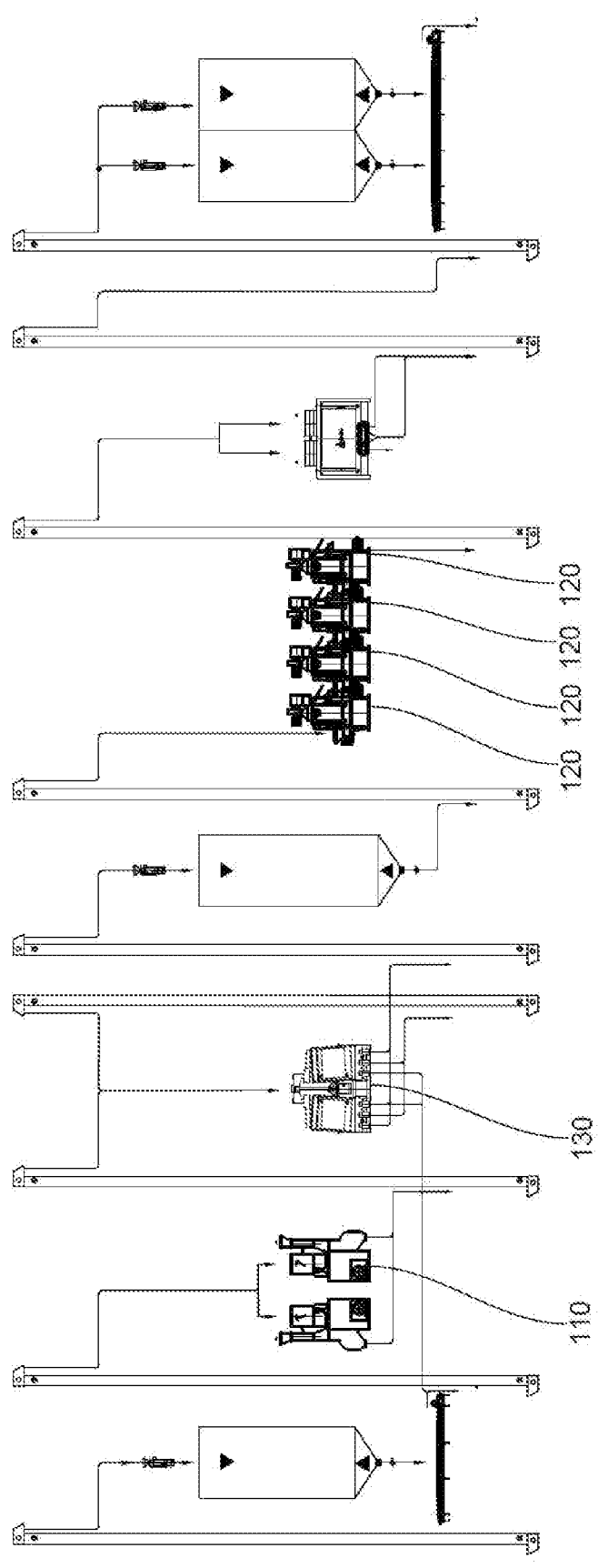
FIG. 4 is a schematic structural diagram of a rice processing unit according to an embodiment of the present disclosure.

Referring to FIG. 3 and FIG. 4, the rice processing unit is configured to perform rice hulling and rice polishing. Specifically, the rice processing unit includes a plurality of rice hullers 110, a plurality of rice polishers 120 and an unpolished rice separator 130; the data acquisition device 210 of a rice huller, and the data acquisition device 220 of a rice polisher in the data acquisition unit conduct data acquisition by corresponding sensors, and the sample detector 230 conducts data acquisition using an online monitoring system for rice varieties; and the cooperative control unit 300 conducts real-time cooperative control over the rice processing unit based on the data acquired by the data acquisition unit.

The device for cooperative control of rice hulling and rice polishing achieves at least the following technical effects: by executing the method for cooperative control of rice hulling and rice polishing in the cooperative control unit 300, and acquiring the operation data of a rice huller, the operation data of a rice polisher and real-time detection data using the data acquisition device 210 of a rice huller, a data acquisition device 220 of a rice polisher and a sample detector 230 in the data acquisition unit, respectively, cooperative control of a plurality of rice hullers 110 and a plurality of rice polishers 120 in the rice processing unit is achieved, and precise and intelligent control of the rice processing and rice products is further achieved, thereby realizing the purpose of lowering energy consumption and loss in rice processing. Compared with some prior arts, the device for cooperative control of rice hulling and rice polishing according to embodiments of the present disclosure can guarantee high reliability and stability, and the rice processing accuracy can be controlled while the broken rice rate, the bran removal degree and energy consumption are minimized.

According to an embodiment in a third aspect of the present disclosure, the computer-readable storage medium stores a computer-executable instruction, and the computer-executable instruction is configured to enable a computer to perform the method for cooperative control of rice hulling and rice polishing according to any embodiment in the first aspect of the present disclosure.

The computer-readable storage medium according to embodiments of the present disclosure achieves at least the following technical effects: by embedding the computer-readable storage medium into a microprocessor chip, the microprocessor chip can execute the method for cooperative control of rice hulling and rice polishing according to an embodiment in a first aspect of the present disclosure in the device for cooperative control of rice hulling and rice polishing according to an embodiment in a second aspect of the present disclosure.

In the description of the present specification, the description with reference to the terms "one embodiment", "some embodiments", "an illustrative embodiment", "an example", "a specific example", or "some examples" means that specific features, structures, materials or characteristics described in connection with the embodiment or example are included in at least one embodiment or example of the present disclosure. In this specification, the schematic representations of the above-mentioned terms do not necessarily refer to the same embodiment or example. Moreover, the described specific features, structures, materials or characteristics can be combined in any one or more embodiments or examples in a suitable manner.

Although the examples of the present disclosure have been illustrated, it should be understood that those of ordinary skill in the art may still make various changes, modifications, replacements, and variations to the above examples without departing from the principle and spirit of the present disclosure, and the scope of the present disclosure is limited by the claims and legal equivalents thereof.

What is claimed is:

1. A method for cooperative control of rice hulling and rice polishing, comprising:

acquiring operation data of a rice huller during a rice hulling process, wherein the operation data of a rice huller comprise a plurality of rice hulling process values corresponding to a plurality of rice hulling process parameters, and the plurality of rice hulling process parameters form a rice hulling process parameter set;

acquiring operation data of a rice polisher during a rice polishing process, wherein the operation data of a rice polisher comprise a plurality of rice polishing process values corresponding to a plurality of rice polishing process parameters, and the plurality of rice polishing process parameters form a rice polishing process parameter set;

acquiring real-time detection data of rice samples after rice hulling and rice polishing, wherein the real-time detection data comprise a plurality of rice quality values of the rice samples under a variety of state indexes;

establishing an energy consumption prediction model and a broken rice rate prediction model via a neural network and in combination with the operation data of a rice huller and the operation data of a rice polisher;

performing optimization and adjustment on some rice hulling process parameters of the rice hulling process parameter set and some rice polishing process parameters of the rice polishing process parameter set by using a machine learning algorithm and in combination with the energy consumption prediction model, the broken rice rate prediction model and the real-time detection data, so as to acquire a plurality of optimized process parameters, and forming an optimized process parameter set with the plurality of optimized process parameters; and controlling rice processing in real time according to the optimized process parameter set.

2. The method for cooperative control of rice hulling and rice polishing according to claim 1, wherein said establishing an energy consumption prediction model and a broken rice rate prediction model via a neural network and in combination with the operation data of a rice huller and the operation data of a rice polisher comprises:

determining a decision variable set of a rice processing technology according to the rice hulling process parameter set and the rice polishing process parameter set;

eliminating abnormal values in the operation data of a rice huller and the operation data of a rice polisher, performing normalization processing to obtain a sample set, and randomly classifying samples in the sample set to a training set and a test set in a proportion of 4:1;

training the neural network using the training set with the decision variable set as an input variable of the neural network, and energy consumption and a broken rice rate as output variables of the neural network so as to obtain the energy consumption prediction model and the broken rice rate prediction model; and testing the trained neural network using the test set.

3. The method for cooperative control of rice hulling and rice polishing according to claim 2, wherein the energy consumption prediction model and the broken rice rate prediction model are constrained respectively using following numerical relationship models:

$$y(E)=f(x_1, x_2, x_3, x_4, x_5, x_6, x_7, x_8, x_9, x_{10}, x_{11}, x_{12}),$$
and $$y(S)=f(x_1, x_2, x_3, x_4, x_5, x_6, x_7, x_8, x_9, x_{10}, x_{11}, x_{12}),$$

wherein $y(E)$ denotes the energy consumption prediction model, $y(S)$ denotes the broken rice rate prediction model, $x_1$ denotes a linear velocity of a high-speed rubber roll of the rice huller, $x_2$ denotes a linear velocity of a low-speed rubber roll of the rice huller, $x_3$ denotes a linear velocity difference of the rice huller, $x_4$ denotes a roll pitch of the rubber roll of the rice huller, $x_5$ denotes an air volume of the rice huller, $x_6$ denotes a roll pressure of the rubber roll of the rice huller, $x_7$ denotes a number of passes of rice polishing, $x_8$ denotes a feeding flow of the rice polisher, $x_9$ denotes an air pressure inside a rice polishing chamber, $x_{10}$ denotes a temperature inside the rice polishing chamber, $x_{11}$ denotes a revolving speed of an emery roll of the rice polisher, and $x_{12}$ denotes a pressure at a discharging port of the rice polisher.

4. The method for cooperative control of rice hulling and rice polishing according to claim 2, wherein said performing optimization and adjustment on some rice hulling process parameters of the rice hulling process parameter set and some rice polishing process parameters of the rice polishing process parameter set by using a machine learning algorithm and in combination with the energy consumption prediction model, the broken rice rate prediction model and the real-time detection data, so as to acquire a plurality of optimized process parameters comprises:

establishing an objective function group according to the energy consumption prediction model, the broken rice rate prediction model and the real-time detection data, wherein the objective function group is configured to represent a relationship between process performance of the rice hulling and rice polishing and the decision variable set; and based on a genetic algorithm, solving a set of optimal solutions from the objective function group to obtain the optimized process parameter set which corresponds to the decision variable set.

5. The method for cooperative control of rice hulling and rice polishing according to claim 4, wherein the objective function group comprises an energy consumption objective function, a broken rice rate objective function and a bran removal degree objective function, and the objective function group is constrained using following numerical relationship models:

$$f_1 = \min(y(E)),$$

$$f_2 = \min(y(S)),$$

$$f_3 = \min\left(\frac{DOM_R - DOM_G}{DOM_G}\right),$$

wherein $f_1$ denotes the energy consumption objective function, $f_2$ denotes the broken rice rate objective function, $f_3$ denotes the bran removal degree objective function, $y(E)$ denotes the energy consumption prediction model, $y(S)$ denotes the broken rice rate prediction model, $DOM_R$ denotes an actual bran removal degree of a rice sample, $DOM_G$ denotes a preset bran removal degree of the rice sample, and min $$\left(\frac{DOM_R - DOM_G}{DOM_G}\right)$$

denotes a minimum deviation in the bran removal degree of the rice sample.

6. The method for cooperative control of rice hulling and rice polishing according to claim 4, wherein said based on a genetic algorithm, solving a set of optimal solutions from the objective function group to obtain the optimized process parameter set comprises:

uniformly generating K chromosome individuals with each having a dimension of 12 in a solution space to generate a primary population, setting a population size to be N=100, setting a maximum number of evolution iterations to be 150, and initializing a selected ratio, a crossover probability and a mutation probability;

based on a calculated value of the objective function group, conducting fast non-dominated sorting and crowding degree calculation on each of chromosome individuals in the primary population;

conducting selection, crossover and mutation on the primary population to obtain a next-generation population;

merging the primary population with the next-generation population to obtain a new population;

based on a calculated value of the objective function group, conducting fast non-dominated sorting and crowding degree calculation on each of chromosome individuals in the new population;

selecting qualified individuals from the new population to form a new primary population; and determining a number of evolution iterations during an evolution process: if the number of evolution iterations is smaller than the maximum number of evolution iterations, adding 1 to the number of evolution iterations, and conducting selection, crossover and mutation on the primary population to obtain a next-generation population; and if the number of evolution iterations is greater than the maximum number of evolution iterations, stopping iteration and outputting the optimized process parameter set.

7. The method for cooperative control of rice hulling and rice polishing according to claim 1, wherein said controlling rice processing in real time according to the optimized process parameter set comprises:

acquiring the real-time detection data in a current rice processing period, and determining a target value of the process performance of the rice hulling and rice polishing;

if the real-time detection data reach the target value, determining the corresponding optimized process parameter set, and maintaining equipment operation based on the optimized process parameter set; and if the real-time detection data do not reach the target value, conducting time series prediction by a trained neural network, and in combination with the operation data of a rice huller and the operation data of a rice polisher so as to obtain an optimized process parameter set updated in a next rice processing period, when the real-time detection data reach the target value, determining a corresponding optimized process parameter set, and maintaining equipment operation with the determined optimized process parameter set.

8. The method for cooperative control of rice hulling and rice polishing according to claim 1, wherein the rice hulling process parameters of the rice huller comprise a feeding flow, a discharging flow, rice hulling energy consumption, a roll pitch of a rubber roll, a roll pressure of the rubber roll, a linear velocity of the rubber roll and a linear velocity difference of the rubber roll; the rice polishing process parameters of the rice polisher comprise a feeding flow, a discharging flow, rice polishing energy consumption, an air pressure inside a rice polishing chamber, a temperature inside the rice polishing chamber, a revolving speed of an emery roll, a pressure at a discharging port and a temperature at the discharging port; and the variety of state indexes comprise a variety, a water content, a grain shape, a husking rate, a bran removal degree, a broken rice rate, a head rice rate and a germ-remained rate.

9. A device for cooperative control of rice hulling and rice polishing, comprising:

a rice processing unit, comprising: a plurality of rice hullers, wherein each of the rice hullers is configured to remove chaff from rice; and a plurality of rice polishers, wherein each of the rice polishers is configured to polish rice treated by the rice huller;

a data acquisition unit, comprising: a data acquisition device of a rice huller, wherein the data acquisition device of a rice huller is configured to acquire operation data of the plurality of rice hullers; a data acquisition device of a rice polisher, wherein the data acquisition device of a rice polisher is configured to acquire operation data of the plurality of rice polishers; and a sample detector configured to acquire values of a plurality of rice samples under a plurality of state indexes, wherein the data acquisition device of a rice huller and the data acquisition device of a rice polisher in the data acquisition unit conduct data acquisition by corresponding sensors and the sample detector conducts data acquisition using an online monitoring system for rice varieties; and a cooperative control unit configured to execute the method for cooperative control of rice hulling and rice polishing according to claim 1.

10. A computer-readable storage medium, wherein the computer-readable storage medium stores a computer-executable instruction, and the computer-executable instruction is configured to enable a computer to perform the method for cooperative control of rice hulling and rice polishing according to claim 1.

11. The device according to claim 9, wherein the device is configured to establish an energy consumption prediction model and a broken rice rate prediction model via a neural network and in combination with the operation data of a rice huller and the operation data of a rice polisher; wherein said establishing an energy consumption prediction model and a broken rice rate prediction model via a neural network and in combination with the operation data of a rice huller and the operation data of a rice polisher comprises:

determining a decision variable set of a rice processing technology according to a rice hulling process parameter set and a rice polishing process parameter set;

eliminating abnormal values in the operation data of the rice huller and the operation data of the rice polisher, performing normalization processing to obtain a sample set, and randomly classifying samples in the sample set to a training set and a test set in a proportion of 4:1;

training the neural network using the training set with the decision variable set as an input variable of the neural network, and energy consumption and a broken rice rate as output variables of the neural network so as to obtain the energy consumption prediction model and the broken rice rate prediction model; and testing the trained neural network using the test set.

12. The device according to claim 11, wherein the energy consumption prediction model and the broken rice rate prediction model are constrained respectively using following numerical relationship models:

$$y(E){=}f(x_1,\ x_2,\ x_3,\ x_4,\ x_5,\ x_6,\ x_7,\ x_8,\ x_9,\ x_{10},\ x_{11},\ x_{12}),$$
    and $$y(S){=}f\ (x_1,\ x_2,\ x_3,\ x_4,\ x_5,\ x_6,\ x_7,\ x_8,\ x_9,\ x_{10},\ x_{11},\ x_{12}),$$

wherein y(E) denotes the energy consumption prediction model, y(S) denotes the broken rice rate prediction model, $x_1$ denotes a linear velocity of a high-speed rubber roll of the rice huller, $x_2$ denotes a linear velocity of a low-speed rubber roll of the rice huller, $x_3$ denotes a linear velocity difference of the rice huller, $x_4$ denotes a roll pitch of the rubber roll of the rice huller, $x_5$ denotes an air volume of the rice huller, $x_6$ denotes a roll pressure of the rubber roll of the rice huller, $x_7$ denotes a number of passes of rice polishing, $x_8$ denotes a feeding flow of the rice polisher, $x_9$ denotes an air pressure inside a rice polishing chamber, $x_{10}$ denotes a temperature inside the rice polishing chamber, $x_{11}$ denotes a revolving speed of an emery roll of the rice polisher, and $x_{12}$ denotes a pressure at a discharging port of the rice polisher.

13. The device according to claim 11, wherein the device is configured to perform optimization and adjustment on some rice hulling process parameters of the rice hulling process parameter set and some rice polishing process parameters of the rice polishing process parameter set by using a machine learning algorithm and in combination with the energy consumption prediction model, the broken rice rate prediction model and the real-time detection data, so as to acquire a plurality of optimized process parameters, and forming an optimized process parameter set with the plurality of optimized process parameters;

wherein said performing optimization and adjustment on some rice hulling process parameters of the rice hulling process parameter set and some rice polishing process parameters of the rice polishing process parameter set by using a machine learning algorithm and in combination with the energy consumption prediction model, the broken rice rate prediction model and the real-time detection data, so as to acquire a plurality of optimized process parameters comprises:

establishing an objective function group according to the energy consumption prediction model, the broken rice rate prediction model and the real-time detection data, wherein the objective function group is configured to represent a relationship between process performance of the rice hulling and rice polishing and the decision variable set; and based on a genetic algorithm, solving a set of optimal solutions from the objective function group to obtain the optimized process parameter set which corresponds to the decision variable set.

14. The device according to claim 13, wherein the objective function group comprises an energy consumption objective function, a broken rice rate objective function and a bran removal degree objective function, and the objective function group is constrained using following numerical relationship models:

$$f_1 = \min(y(E)),$$

$$f_2 = \min(y(S)),$$

$$f_3 = \min\left(\frac{DOM_R - DOM_G}{DOM_G}\right),$$

wherein $f_1$ denotes the energy consumption objective function, $f_2$ denotes the broken rice rate objective function, $f_3$ denotes the bran removal degree objective function, y(E) denotes the energy consumption prediction model, y(S) denotes the broken rice rate prediction model, $DOM_R$ denotes an actual bran removal degree of a rice sample, $DOM_G$ denotes a preset bran removal degree of the rice sample, and min $$\left(\frac{DOM_R - DOM_G}{DOM_G}\right)$$

denotes a minimum deviation in the bran removal degree of the rice sample.

15. The device according to claim 13, wherein said based on a genetic algorithm, solving a set of optimal solutions from the objective function group to obtain the optimized process parameter set comprises:

uniformly generating K chromosome individuals with each having a dimension of 12 in a solution space to generate a primary population, setting a population size to be N=100, setting a maximum number of evolution iterations to be 150, and initializing a selected ratio, a crossover probability and a mutation probability;

based on a calculated value of the objective function group, conducting fast non-dominated sorting and crowding degree calculation on each of chromosome individuals in the primary population;

conducting selection, crossover and mutation on the primary population to obtain a next-generation population;

merging the primary population with the next-generation population to obtain a new population;

based on a calculated value of the objective function group, conducting fast non-dominated sorting and crowding degree calculation on each of chromosome individuals in the new population;

selecting qualified individuals from the new population to form a new primary population; and determining a number of evolution iterations during an evolution process: if the number of evolution iterations is smaller than the maximum number of evolution iterations, adding 1 to the number of evolution iterations, and conducting selection, crossover and mutation on the primary population to obtain a next-generation population; and if the number of evolution iterations is greater than the maximum number of evolution iterations, stopping iteration and outputting the optimized process parameter set.

16. The device according to claim 9, wherein the device is configured to control rice processing in real time according to the optimized process parameter set;

wherein said controlling rice processing in real time according to the optimized process parameter set comprises:

acquiring the real-time detection data in a current rice processing period, and determining a target value of the process performance of the rice hulling and rice polishing;

if the real-time detection data reach the target value, determining the corresponding optimized process parameter set, and maintaining equipment operation based on the optimized process parameter set; and if the real-time detection data do not reach the target value, conducting time series prediction by a trained neural network, and in combination with the operation data of a rice huller and the operation data of a rice polisher so as to obtain an optimized process parameter set updated in a next rice processing period, when the real-time detection data reach the target value, determining a corresponding optimized process parameter set, and maintaining equipment operation with the determined optimized process parameter set.

17. The device according to claim 9, wherein a data acquisition unit includes rice hulling process parameters and rice polishing process parameters; wherein the rice hulling process parameters of the rice huller comprise a feeding flow, a discharging flow, rice hulling energy consumption, a roll pitch of a rubber roll, a roll pressure of the rubber roll, a linear velocity of the rubber roll and a linear velocity difference of the rubber roll; the rice polishing process parameters of the rice polisher comprise a feeding flow, a discharging flow, rice polishing energy consumption, an air pressure inside a rice polishing chamber, a temperature inside the rice polishing chamber, a revolving speed of an emery roll, a pressure at a discharging port and a temperature at the discharging port; and the variety of state indexes comprise a variety, a water content, a grain shape, a husking rate, a bran removal degree, a broken rice rate, a head rice rate and a germ-remained rate.

18. The computer-readable storage medium according to claim 10, wherein said establishing an energy consumption prediction model and a broken rice rate prediction model via a neural network and in combination with the operation data of a rice huller and the operation data of a rice polisher comprises:

determining a decision variable set of a rice processing technology according to the rice hulling process parameter set and the rice polishing process parameter set;

eliminating abnormal values in the operation data of a rice huller and the operation data of a rice polisher, performing normalization processing to obtain a sample set, and randomly classifying samples in the sample set to a training set and a test set in a proportion of 4:1;

training the neural network using the training set with the decision variable set as an input variable of the neural network, and energy consumption and a broken rice rate as output variables of the neural network so as to obtain the energy consumption prediction model and the broken rice rate prediction model; and testing the trained neural network using the test set.

19. The computer-readable storage medium according to claim 18, wherein the energy consumption prediction model and the broken rice rate prediction model are constrained respectively using following numerical relationship models:

$$y(E) = f(x_1, x_2, x_3, x_4, x_5, x_6, x_7, x_8, x_9, x_{10}, x_{11}, x_{12}),$$
and $$y(S) = f(x_1, x_2, x_3, x_4, x_5, x_6, x_7, x_8, x_9, x_{10}, x_{11}, x_{12}),$$

wherein y(E) denotes the energy consumption prediction model, y(S) denotes the broken rice rate prediction model, $x_1$ denotes a linear velocity of a high-speed rubber roll of the rice huller, $x_2$ denotes a linear velocity of a low-speed rubber roll of the rice huller, $x_3$ denotes a linear velocity difference of the rice huller, $x_4$ denotes a roll pitch of the rubber roll of the rice huller, $x_5$ denotes an air volume of the rice huller, $x_6$ denotes a roll pressure of the rubber roll of the rice huller, $x_7$ denotes a number of passes of rice polishing, $x_8$ denotes a feeding flow of the rice polisher, $x_9$ denotes an air pressure inside a rice polishing chamber, $x_{10}$ denotes a temperature inside the rice polishing chamber, $x_{11}$ denotes a revolving speed of an emery roll of the rice polisher, and $x_{12}$ denotes a pressure at a discharging port of the rice polisher.

20. The computer-readable storage medium according to claim 18, wherein said performing optimization and adjustment on some rice hulling process parameters of the rice hulling process parameter set and some rice polishing process parameters of the rice polishing process parameter set by using a machine learning algorithm and in combination with the energy consumption prediction model, the broken rice rate prediction model and the real-time detection data, so as to acquire a plurality of optimized process parameters comprises:

establishing an objective function group according to the energy consumption prediction model, the broken rice rate prediction model and the real-time detection data, wherein the objective function group is configured to represent a relationship between process performance of the rice hulling and rice polishing and the decision variable set; and based on a genetic algorithm, solving a set of optimal solutions from the objective function group to obtain the optimized process parameter set which corresponds to the decision variable set.

* * * * *